United States Patent [19]

Farnam

[11] 3,966,862

[45] June 29, 1976

[54] METHOD OF RECONSTITUTING MICA

[76] Inventor: Franklin C. Farnam, 19 Glenview Road, Asheville, N.C. 28804

[22] Filed: Sept. 27, 1974

[21] Appl. No.: 509,910

[52] U.S. Cl. .............................. 264/110; 264/63; 264/125; 264/332
[51] Int. Cl. ............................................. C04b 35/16
[58] Field of Search ............ 264/110, 332, 63, 125; 241/4

[56] References Cited
UNITED STATES PATENTS

| | | | |
|---|---|---|---|
| 2,367,047 | 1/1945 | Pellett | 264/110 |
| 2,542,827 | 2/1951 | Minter | 264/110 |
| 2,760,879 | 8/1956 | McDaniel et al. | 264/110 |
| 3,310,411 | 3/1967 | Vedder et al. | 264/110 |
| 3,764,456 | 10/1973 | Woodhams | 264/110 |

*Primary Examiner*—Jan H. Silbaugh
*Assistant Examiner*—John Parrish
*Attorney, Agent, or Firm*—Bell, Seltzer, Park & Gibson

[57] ABSTRACT

A method of making reconstituted mica sheet in which dry ground mica is blended together with dry ground thermoplastic polyester to produce a dry powder mixture having no more than about 90% mica by weight of mixture, the dry powder mixture is formed into a layer, and the layer of dry powder is subjected to heat and pressure for softening the polyester and bonding the mica into sheet form. The mica used preferably is scrap mica and the polyester used preferably is scrap polyethylene terephthlate, ground to have particle size distributions as set forth in detail hereinafter.

7 Claims, No Drawings

METHOD OF RECONSTITUTING MICA

The insulating and dielectric properties of mica have long been recognized and sheet mica has long been employed in the manufacture of special electrical devices. While the uses of sheet mica and the fabrication thereof are well known to persons skilled in the electrical manufacturing arts, such uses may include, by way of example and not by way of limitation, the stamping of insulating supports about which low wattage electrical resistant heaters are wound and the fabrication of capacitors. As is also known to persons skilled in the pertinent electrical arts, supplies of sheet mica in pieces having larger surface areas are restricted, with the principal source supply being India. Due to the restricted supply of such mica, the material has relatively become expensive and man-made substitute materials have been sought. However, to the extent that such substitute materials have been acceptable for certain uses, they are also expensive and in short supply.

As has been shown by the development of certain wholly man-made substitutes for natural sheet mica, certain uses of mica permit acceptance of lower operating temperature conditions, within the range of softening or melting temperatures of certain synthetic materials. Recognizing these possible uses and the limitations of availability and cost of the materials heretofore used, it has heretofore been proposed to reconstitute mica into a sheet form. Such prior proposals have typically involved the use of esoteric binders and liquid processes in which solutions of binders and mica are employed. Such processes introduce further and additional difficulties, in that the binder materials used are neither inexpensive nor readily available and the reliance upon liquid processing creates difficulty in preparing, handling and eventually drying the mixtures used.

Having in mind the difficulties and deficiencies of materials and processes heretofore proposed, it is an object of this invention to reconstitute mica into sheet form in accordance with a dry process which particularly facilitates handling of the materials employed in the final formation of the desired sheet material. In realizing this object of the present invention, dry ground mica is mixed with a dry ground binder to produce a dry powder mixture which is then formed into a layer and bonded into sheet form. The difficulties of segregation by settling of materials and of long drying times heretofore encountered in liquid processes are thereby obviated.

Yet a further object of this invention is the production of inexpensive reconstituted mica sheet by the use, as starting materials, of scrap which is readily available at relatively low cost. In accordance with this invention, the mica employed is scrap mica of sizes not otherwise commercially acceptable, while the binder is a scrap thermoplastic polyester which would otherwise be discarded.

While some of the objects of this invention have been stated, other objects will appear as the description proceeds. While it is to be understood that the following description will refer to the best mode for the practice of this invention known at the time that the description was prepared, it is contemplated that the description of this invention will aid persons skilled in the pertinent arts to understand the general applicability of this invention. For that reason, the description is to be understood broadly, rather than as restricting on the scope of this invention.

It is known that the production, in India, of sheet mica having commercially acceptable sizes has resulted in large quantities of scrap mica not otherwise usable. Such scrap mica forms a supply of low cost material which, in accordance with this invention, can be reconstituted into a commercially usable sheet mica form. Further, it is known that the production of textile fibers of thermoplastic polyester and the manufacture of yarn from such material results in quantities of scrap polyester of no presently known significant commercial utility. In accordance with this invention, such scrap polyester is the second of two low cost materials used in producing reconstituted mica sheet.

Generally, the method of the present invention involves blending together dry ground mica having a particle size of less than about 14 mesh and dry ground thermoplastic polyester having a particle size of less than about 60 mesh. The blending is such as to produce a dry powder mixture having from about 90 to about 50% mica by weight of mixture, and preferably having 75% mica by weight of mixture. In order to facilitate obtaining a minimum material cost, it is contemplated by the present invention that polyester shall be supplied in such quantity as to constitute the entirety of any remainder, by weight of mixture, necessary for addition to the mica.

After production of the dry powder mixture, the mixture is formed into a layer, preferably by shaping the dry powder mixture to have predetermined width and length dimensions and a substantially uniform thickness throughout those dimensions. As will be understood, the thickness of the layer formed may vary depending upon the particular end use of the reconstituted mica sheet to be produced and upon other process parameters as will be pointed out more fully hereinafter. Further, it will be understood as desirable to have the dry powder mixture temporarily supported on an underlying substrate in order to ensure that the layer retains the desired substantially uniform thickness and width and length dimensions.

The dry powder layer is then subjected to heat and pressure for softening the polyester and bonding the mica into sheet form. While it is anticipated that the temperature to which the layer is heated may vary in range of from about 400° to about 500° F., the significant characteristic of such heating is the softening of the polyester constituent of the mixture. In this regard, the softening temperature of the preferred thermoplastic polyester, polyethylene terephthlate is known to be as low as 300° F. when in ground form as herein described. Similarly, it is contemplated that the pressure applied may vary in the range of from about 300 pounds per square inch to about 1,000 pounds per square inch, with the significant characteristic being the end production of a securely bonded mica sheet having the desired thickness.

As will be understood, exertion of pressure on the heated powder layer will result in reduction of thickness of that layer as the reconstituted mica sheet of this invention is formed. As it is contemplated as possible to produce reconstituted mica sheet in accordance with this invention which has a finished thickness in the range of from about 6 mils to about ¼ inch, it is to be recognized that the possible thickness of the dry powder layer may vary over a significant range. In light of the reduction experienced in practicing this invention, the thickness to which the dry powder layer is formed may be expected to be from about 3/64 to about 2 inches. Preferred ranges for the dry power layer are from about ⅛ to about ¾ inches thick, producing reconstituted mica sheet of from about 1/64 to about 3/34 inches thickness.

Other alternative procedures for the present method of making reconstituted mica sheet can be seen from the following:

EXAMPLE 1

Scrap mica obtained from India was ground in a hammer mill to produce dry ground mica having a particle size of less than about 14 mesh. "Beards" of thermoplastic polyester formed as scrap from the sawing of blocks of such material were obtained from a textile fiber manufacturer and were ground in a hammer mill to produce dry ground thermoplastic polyester having a particle size of less than about 60 mesh. The two dry ground materials were introduced into a ribbon blender in such quantities as to produce a mixture in which 90% by weight of the mixture was mica and 10% by weight of the mixture was polyester and the materials were then blended together for 45 minutes. The blended materials were then sifted onto a metal slip sheet measuring 24 inches by 72 inches. A plurality of such sheets were prepared and stacked between the platens of a hydraulic press with one electrical resistance heating element interleaved with about every four layers of powder. The press was closed to apply pressure of approximatey 700 psi and the heating elements were energized to heat the stack to a temperature of 600° F. On the stack temperature reaching 600° F., the heating elements were deenergized and the press was maintained closed for approximately 3 nours or until the temperature of the stack dropped to at least 200° F. Thereupon, the press was opened, the stack of sheets removed therefrom, and finished reconstituted mica sheets removed from the slip sheets.

EXAMPLE 2

Mica similar to that for Example 1 was calcined or fired in a kiln for 15 minutes at 1,200° F. to facilitate delamination of the mica. The calcined mica was then ground in a hammer mill to produce particle sizes in the range of from about 200 mesh to about 14 mesh. Scrap polyester yarn was obtained from a source in the textile industry, softened and cast into block form. The blocks of polyester were then ground in a hammer mill to produce particles of less than about 60 mesh size. Quantities of the dry ground mica and dry ground thermoplastic polyester necessary to form a mixture having about 75% mica by weight and about 25% polyester by weight were then introduced into a blender and blended together for 30 minutes. The blended materials were then immediately sifted onto the upper surface of a moving belt, to form on the belt an elongate dry powder layer extending for the width of the belt and having substantially uniform thickness across the belt. The belt advanced through an oven and the dry powder layer carried thereby was heated to approximately 500° F. As heated dry powder was carried from the oven by the belt, the belt and dry powder layer passed between a pair of compressive rolls exerting approximately 1,000 psi on the heated layer to compress the layer and bond the mica and softened polyester into sheet form. The reconstituted mica sheet was permitted to cool and was then stripped from the belt.

EXAMPLE 3

Mica was obtained, calcined and ground as described above in Example 2 and was screened to provide the following analysis:
  8% plus 14 mesh
  12% plus 20 mesh
  41% plus 42 mesh
  17% plus 60 mesh
  14% plus 100 mesh
  8% plus 200 mesh "Beards" of polyethylene terephthlate were obtained and ground in a hammer mill to produce particles sized in the range of less than about 60 mesh. Equal quantities, by weight, of the dry ground mica and dry ground polyethylene terephthlate were then blended together and sifted onto slip sheets as described above with reference to Example 1. The slip sheets were stacked, inserted into a hydraulic press, and placed under about 300 psi pressure. The stack of slip sheets and dry powder layers was then heated, by energization of electrical heater elements interspersed throughout the stack, to a temperature of approximately 450° F., at which time energization of the electrical heaters was discontinued. The stack was then maintained under pressure until the temperature of the stack returned to ambient room temperature, after which time the stack was removed from the press and the finished reconstitued mica sheets were removed from the slip sheets.

It has been observed that reconstituted mica sheet produced in accordance with the present invention will withstand subjection to operating temperatures on the order of 450° F. and has electrical and mechanical properties very similar to natural virgin mica sheet.

In the specification, there has been set forth a preferred embodiment of the invention, and although specific terms are employed, they are used in a generic and descriptive sense only and not for purposes of limitation.

That which is claimed is:

1. In a method of making reconstituted mica sheet including the steps of blending mica and polyester, forming the mixture into a layer, and subjecting the layer to heat and pressure for bonding the layer into sheet form, the improvement comprising providing dry ground mica having a particle size in the range of from about 200 mesh to about 14 mesh; providing ground thermoplastic polyester having a particle size of less than about 60 mesh; proportioning the mixture to have from about 90 to about 50% mica by weight of the mixture; forming the layer to have a thickness in the range of from about ⅛ inch to about ¾ inch; bonding the layer into a sheet having a thickness in the range of from about 1/64 inch to about 3/34 inch; and maintaining the ground mica and ground polyester free from water during the steps of blending while producing the mixture, forming the layer and subjecting the layer to heat and pressure.

2. A method according to claim 1 comprising sifting the mixture onto a substrate and temporarily supporting the layer on the substrate during softening of the polyester and bonding of the mica into sheet form.

3. A method according to claim 1 wherein the step of providing ground polyester further comprises grinding scrap polyethylene terephthlate.

4. A method according to claim 1 wherein the subjecting of the layer to heat and pressure comprises heating the layer to a temperature in the range of from about 400° to about 500° F. and pressing the layer with a force in the range of from about 300 psi to about 1,000 psi.

5. A method according to claim 1 wherein the subjecting of the layer to heat and pressure further comprises simultaneously heating and compressing the layer.

6. A method according to claim 1 wherein the proportioning of the mixture comprises producing a mixture having about 75% mica by weight of mixture and about 25% polyethylene terephthlate by weight of mixture.

7. In a method of making reconstituted mica sheet including the steps of blending mica and polyester together while producing a mixture of mica and polyester, forming the mixture into a layer, and subjecting the layer to heat and pressure for bonding the layer into sheet form, the improvement comprising providing dry ground mica having a particle size in the range of from about 200 mesh to about 14 mesh; providing ground polymerized polyethylene terephthlate having a particle size of less than about 60 mesh; proportioning the mixture to consist of about 75% mica and about 25% polyethylene terephthlate by weight of mixture; forming the layer to have a thickness in the range of from about ⅛ inch to about ¾ inch; bonding the layer into a sheet having a thickness in the range of from about 1/64 inch to about 3/34 inch; and maintaining the mica and polyethylene terephthlate free from water during the steps of blending while producing the mixture, forming the layer and subjecting the layer to heat and pressure.

\* \* \* \* \*

UNITED STATES PATENT OFFICE
CERTIFICATE OF CORRECTION

Patent No. 3,966,862  Dated June 29, 1976

Inventor(s) Franklin C. Farnam

It is certified that error appears in the above-identified patent and that said Letters Patent are hereby corrected as shown below:

Column 1, line 15, after "source" insert -- of --.

Column 3, line 35, "nours" should read -- hours --.

Signed and Sealed this

Twenty-third Day of November 1976

[SEAL]

Attest:

RUTH C. MASON
Attesting Officer

C. MARSHALL DANN
Commissioner of Patents and Trademarks